Patented Jan. 23, 1951

2,538,943

UNITED STATES PATENT OFFICE 2,538,943

PRODUCTION OF STREPTOMYCIN

Lloyd Everett McDaniel, Rahway, and David Hendlin, Elizabeth, N. J., assignors to Merck & Co., Inc., Rahway, N. J., a corporation of New Jersey No Drawing. Application April 24, 1948, Serial No. 23,136

1 Claim. (Cl. 195—80)

This invention relates to the production of antibiotics and particularly to the production of streptomycin by the cultivation of strains of the organism *Streptomyces griseus* employing new and improved nutrient mediums containing distillers solubles as a nitrogen source.

The production of streptomycin since its original discovery and disclosure by Schatz, Bugie, and Waksman ("Proceedings of the Society for Experimental Biology and Medicine," 55, 66–69 (1944)) has been dependent largely upon the use of nutrient mediums in the propagation of strains of *S. griseus* which contain either meat extract or corn steep liquor as factors essential for satisfactory growth and streptomycin production. Both of these nutrient components, however, leave much to be desired in the large scale production of streptomycin since they are relatively expensive materials and further since there are wide variations in composition of these materials which lead to erratic and often unsatisfactory yields of streptomycin.

Although it might seem that other nitrogen sources could readily be substituted for meat extract or corn steep liquor, it is found that while such substitutions will often provide satisfactory growth of the organism, they do not generally foster good streptomycin production by the organism.

We have now discovered in accordance with the present invention that satisfactory growth of and good streptomycin production by strains of the organism *S. griseus* can be obtained by employing distillers solubles as the sole or principal source of organic nitrogen. Distillers solubles can be used in the undried form known as "whiskey slop" or in the form of the dried product, the latter being preferred both from the standpoint of ease in handling and the yields of streptomycin obtained.

In order to obtain good yields using distillers solubles, we have found that it is essential that the medium also contain small amounts of NaCl and $NaNO_3$, as well as other inorganic nutrient salts including $K_2HOP_4$, $MgSO_4.7H_2O$, $ZnSO_4.7H_2O$, $FeSO_4.7H_2O$, and $CaCl_2$. The presence of $NaNO_3$ appears to be necessary for streptomycin production using distillers solubles and it is also essential that either NaCl or KCl be present. In addition to the foregoing it is, of course, necessary to include in the medium a carbon source such as a carbohydrate, starch, hydrol, or the like, the most effective source of carbon being dextrose. While satisfactory results are obtained using mediums having compositions as above described, it is sometimes advisable to employ an additional or supplementary amount of an organic nitrogen source such, for example, as a tryptic digest of casein. The effect of such supplementary organic nitrogen appears to be a shortening of the time required to reach maximum streptomycin production, and the yields obtained using mediums containing both distillers solubles and a tryptic digest of casein are generally of the same order as yields obtained when only the distillers solubles is present, and may even exceed such yields.

While it would be understood that minor variations in the amounts of various medium components may be necessary or advisable to obtain best results with particular strains of *S. griseus* and in particular fermentation equipment, we have found that satisfactory results are obtained when the medium components are employed in the following amounts: dextrose—1–3% and preferably about 1%; distillers solubles—1–3% and preferably about 2%; NaCl—1%; $NaNO_3$—0.5%; and the nutrient inorganic salts $K_2HPO_4$, $MgSO_4.7H_2O$, $ZnSO_4.7H_2O$, $FeSO_4.7H_2O$, and $CaCl_2$ in amounts totalling, if present, about 0.3%. When a supplemental organic nitrogen source such as tryptic digest of casein is added to the medium, it is preferable to add about 1% of such organic nitrogen source.

Distillers solubles from different sources may comprise corn, wheat, or other grain solubles recovered from residual mashes in the alcohol distilling industries. The dried distillers solubles generally show the following assay values:

| | Per cent |
|---|---|
| Crude protein | 30–33 |
| Crude fat | 10–12 |
| Crude fiber | 3– 4 |
| Ash | 6– 7 |

The crude protein content of 30–33% may be further broken down approximately as follows:

| | Per cent |
|---|---|
| Amino acids | 2.5 |
| Yeast protein | 11 |
| Amines and ammonia | 1 |
| Cereal proteins and peptones | 15 |

In the production of streptomycin using improved mediums of the type above described, the selected medium is first sterilized in the usual way as, for example, by heating to about 120° C. for about 30 minutes, and is then inoculated with a vegetable culture of *S. griseus*. The inoculated medium is then incubated at 28° C. while maintaining the organism in a submerged aerated state by constant agitation and aeration of the medium. Incubation is continued for a period generally ranging from 3 to 5 days until maximum streptomycin yield is reached. The fermented medium is then filtered and treated for recovery of streptomycin therefrom in the usual way.

The following examples show various ways of carrying out our invention but it is to be understood that these examples are given by way of illustration and not of limitation.

*Example I*

A medium was prepared containing

| | Per cent |
|---|---|
| Meat extract | 0.6 |
| Dextrose | 1 |
| NaCl | 1 |
| Corn solubles | 2 |
| Tap water to 100% | 2 |

The medium was subdivided into Erlenmeyer flasks which were fitted with cotton plugs. The flasks containing the medium were sterilized at 120° C. for 30 minutes. After sterilization the medium was inoculated with a vegetative culture of *S. griseus* and was incubated at 28° C. on a rotary shaking machine to produce a submerged growth. The medium, after 3 days incubation, showed a streptomycin content of 250 mcg./cc.

*Example II*

Mediums were prepared containing

1% dextrose
1% NaCl
0.5% $NaNO_3$
Distillers solubles (as indicated)
Salts
Tap water to 100%

These mediums were subdivided into Erlenmeyer flasks, sterilized, inoculated, and incubated as described in Example I and after 4 days incubation were assayed for streptomycin content. The results obtained are as follows:

| Concentrated Distillers Solubles (wheat mash) | Activity, 4 days |
|---|---|
| | Mcg./cc. |
| 1 per cent | 90 |
| 2 per cent | 215 |
| 2.5 per cent | 203 |
| 3.0 per cent | 220 |
| 4.0 per cent | 66 |
| 5.0 per cent | 40 |
| 2.5 per cent (no salts) | 140 |
| Whole dry yeast (control) | 140 |

*Example III*

Three basic mediums were prepared having the following compositions:

| Medium A | Medium B | Medium C |
|---|---|---|
| 1% dextrose<br>1% NaCl | 1% dextrose<br>1% NaCl<br>0.5% $NaNO_3$ | 1% Tryptic digest of casein<br>1% dextrose<br>1% NaCl<br>0.5% $NaNO_3$ |
| +<br>0.1% $K_2HPO_4$<br>0.1% $MgSO_4.7H_2O$<br>0.0002% $ZnSO_4.7H_2O$<br>0.001% $FeSO_4.7H_2O$<br>0.01% $CaCl_2$ | +<br>0.1% $K_2HPO_4$<br>0.1% $MgSO_4.7H_2O$<br>0.0002% $ZnSO_4.7H_2O$<br>0.001% $FeSO_4.7H_2O$<br>0.01% $CaCl_2$ | +<br>0.1% $K_2HPO_4$<br>0.1% $MgSO_4.7H_2O$<br>0.0002% $ZnSO_4.7H_2O$<br>0.001% $FeSO_4.7H_2O$<br>0.01% $CaCl_2$ |

Part of each of the mediums A, B, and C were subdivided into Erlenmeyer flasks and to the remainder of each of the mediums was added 2% of distillers solubles. The mediums thus enriched with distillers solubles were in turn subdivided into additional Erlenmeyer flasks. The flasks were sterilized, inoculated, and incubated as described in Example I. The comparative maximum yields of streptomycin obtained are as follows:

| | Activities | |
|---|---|---|
| | Without Distillers Solubles | With Distillers Solubles |
| Medium A | 0 mcg./cc. in 5 days | 0 mcg./cc. in 5 days. |
| Medium B | 0 mcg./cc. in 5 days | 58 mcg./cc. in 3 days. |
| Medium C | 167 mcg./cc. in 3 days | 216 mcg./cc. in 3 days. |

It is evident from consideration of Example III that addition of distillers solubles to the medium does not result in significant yields of streptomycin unless $NaNO_3$ is present in the medium. It is also evident from a consideration of Example II that so long as NaCl and $NaNO_3$ are present in the medium, relatively high yields of streptomycin are obtained even when the other nutrient inorganic salts are omitted. It is further evident that most favorable results are obtained when the medium contains, in addition to distillers solubles, an amount of a supplementary source of organic nitrogen.

Various changes and modifications in the procedures and medium compositions herein described will be apparent to those versed in the art, and to the extent that such changes and modifications are within the purview of the appended claim it is to be understood that they constitute part of our invention.

We claim:

The process for producing streptomycin that comprises propagating strains of the organism *S. griseus* under submerged aerated conditions in an aqueous medium having nutrient components comprising carbohydrate, inorganic salts, distillers solubles, and a supplementary nitrogenous substance selected from the group consisting of sodium nitrate and nitrogenous organic complexes.

LLOYD EVERETT McDANIEL.
DAVID HENDLIN.

REFERENCES CITED

The following references are of record in the file of this patent:

Proc. Soc. Exp. Biol. and Med., 55, 67 (1944).
Staff Meetings of the Mayo Clinic, 19, 546, 548 (1944).
J. Am. Pharm. Assoc., 34, 275 (1945).
Waksman et al., Jour. Am. Pharm. Assn., Scientific Ed., vol. XXXIV, No. 11 (22), November 1945, p. 275.
Wickerham et al., Archives of Biochem., vol. 9, #1, January 1946, p. 96.
Le Page et al., Jour. Biol. Chem., vol. 162, #1, January 1946, pp. 163–170.
J. Bact., 51, 753–9 (1946).